(12) United States Patent
Buckner

(10) Patent No.: US 9,194,102 B2
(45) Date of Patent: Nov. 24, 2015

(54) AIR DIVERTER FOR A VACUUM EXCAVATOR

(71) Applicant: Don M. Buckner, Okahumpka, FL (US)

(72) Inventor: Don M. Buckner, Okahumpka, FL (US)

(73) Assignee: VAC-TRON EQUIPMENT, LLC, Okahumpka, FL (US)

( * ) Notice: Subject to any disclaimer, the term of this patent is extended or adjusted under 35 U.S.C. 154(b) by 139 days.

(21) Appl. No.: 14/133,745

(22) Filed: Dec. 19, 2013

(65) Prior Publication Data

US 2015/0176243 A1    Jun. 25, 2015

(51) Int. Cl.
*B65G 51/30* (2006.01)
*E02F 3/90* (2006.01)
*E02F 3/88* (2006.01)
*F16K 11/052* (2006.01)

(52) U.S. Cl.
CPC ............. *E02F 3/90* (2013.01); *E02F 3/8816* (2013.01); *F16K 11/0525* (2013.01)

(58) Field of Classification Search
USPC .............. 406/13, 39, 181, 183, 151, 172; 417/315, 313, 423.9
See application file for complete search history.

(56) References Cited

U.S. PATENT DOCUMENTS

| 3,331,090 | A | | 7/1967 | Reiber et al. | |
| 3,614,275 | A | * | 10/1971 | Eibsen | 418/206.1 |
| 3,937,622 | A | * | 2/1976 | Hewitt et al. | 96/113 |
| 4,052,178 | A | * | 10/1977 | Frantz | 96/399 |
| 4,870,760 | A | * | 10/1989 | Graff | 34/473 |
| 5,355,549 | A | | 10/1994 | Steinberg et al. | |
| 6,213,726 | B1 | * | 4/2001 | Tuckey | 417/199.1 |
| 6,705,316 | B2 | * | 3/2004 | Blythe et al. | 128/204.18 |
| 6,898,867 | B1 | * | 5/2005 | VanderPyl | 34/515 |
| 6,920,665 | B2 | | 7/2005 | Tucker | |
| 7,524,415 | B2 | * | 4/2009 | Beaulieu | 210/207 |
| 2002/0074273 | A1 | * | 6/2002 | Golovatai-Schmidt et al. | 210/130 |
| 2007/0199203 | A1 | * | 8/2007 | Federico | 34/416 |
| 2011/0023457 | A1 | * | 2/2011 | Miebach et al. | 60/274 |
| 2011/0073428 | A1 | * | 3/2011 | Aberg | 192/48.616 |
| 2011/0265881 | A1 | | 11/2011 | Morgan et al. | |
| 2012/0071647 | A1 | * | 3/2012 | Lade et al. | 536/122 |
| 2013/0199271 | A1 | * | 8/2013 | Beer et al. | 73/28.04 |
| 2014/0186505 | A1 | * | 7/2014 | Banke et al. | 426/429 |

* cited by examiner

*Primary Examiner* — Joseph Dillon, Jr.
(74) *Attorney, Agent, or Firm* — Matthew G. McKinney, Esq.; Allen, Dyer, Doppelt, Milbrath & Gilchrist, P.A.

(57) ABSTRACT

An air diverter system for a vacuum excavator is disclosed. In a particular embodiment, the system includes a bag house in communication with a debris tank. In addition, the system includes a filter housing secured to a side of the bag house and a valve housing interposed between the bag house and the filter housing. A valve member is mounted within the valve housing and is configured to rotate about an axis to define at least two different passageways for an air flow. The system also includes a selector for rotating the valve member and selectively aligning the passageway for the airflow between a vacuum pump inlet and either the filter housing or the bag house.

9 Claims, 4 Drawing Sheets

AIR DIVERTER FOR A VACUUM EXCAVATOR

I. Field

The present invention relates in general to an air diverter system for a vacuum excavator.

II. DESCRIPTION OF RELATED ART

Industrial vacuum equipment has many uses such as locating underground utilities (potholing), hydro excavation, air excavation and vacuum excavation. In addition, the equipment can be used for directional drilling slurry removal, industrial clean-up, waste clean-up, lateral and storm drain clean-out, oil spill clean-up and other natural disaster clean-up applications, for example. The vacuum equipment may be mounted to a truck or trailer and is typically powered by gas or diesel engines. Both the wet and dry material is vacuumed up and stored in a debris tank. From there, the material may be hauled away and disposed of off-site or the debris tank may be emptied at the site.

Existing industrial vacuum equipment utilizes a high volume induced flow from a vacuum pump to vacuum water and debris into the debris tank through a flexible hose. The debris is captured in the debris tank as the dirty air passes through the debris tank and filtered before the air is ultimately discharged as exhaust. A problem often encountered when excavating is that rocks or other debris are vacuumed partially into the hose and cannot pass through the hose, which blocks the suction power. The vacuum equipment must then be shut down while the blockage is removed from the hose, which is a time consuming and an inefficient process. In addition, the filters may become clogged as particles collect on the filters and the flow path is restricted causing the reduction in suction power of the vacuum pump. Further, removing the debris from the filters is time consuming and reduces the efficiency of the excavating process. Also, existing vacuum equipment filters are undesirably located where a user cannot access the filters without having to climb onto the equipment to change or clean the filters.

Therefore, a need exists in the art for a system that is able to quickly and easily reverse the direction of the air flow to dislodge rocks and other blockages from the hoses and also that is easy to service the filters. However, in view of the prior art at the time the present invention was made, it was not obvious to those of ordinary skill in the pertinent art how the identified needs could be fulfilled.

III. SUMMARY

In a particular embodiment, an air diverter system for a vacuum excavator is disclosed. The system includes a bag house and a filter housing secured to a side of the bag house, where the filter housing is in communication with the bag house. A filter chamber is disposed inside the filter housing. In addition, the system includes a valve housing interposed between the bag house and the filter housing. A valve member mounted within the valve housing is configured to rotate about an axis. In addition, the system includes a first orifice of the valve housing in communication with the bag house, a second orifice of the valve housing in communication with the filter chamber, a third orifice of the valve housing in communication with a vacuum pump inlet, a fourth orifice of the valve housing in communication with the vacuum pump outlet, and a selector for rotating the valve member and selectively aligning a passageway of an airflow between the third orifice of the valve housing in communication with the vacuum pump inlet and the first or second orifice of the valve housing.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
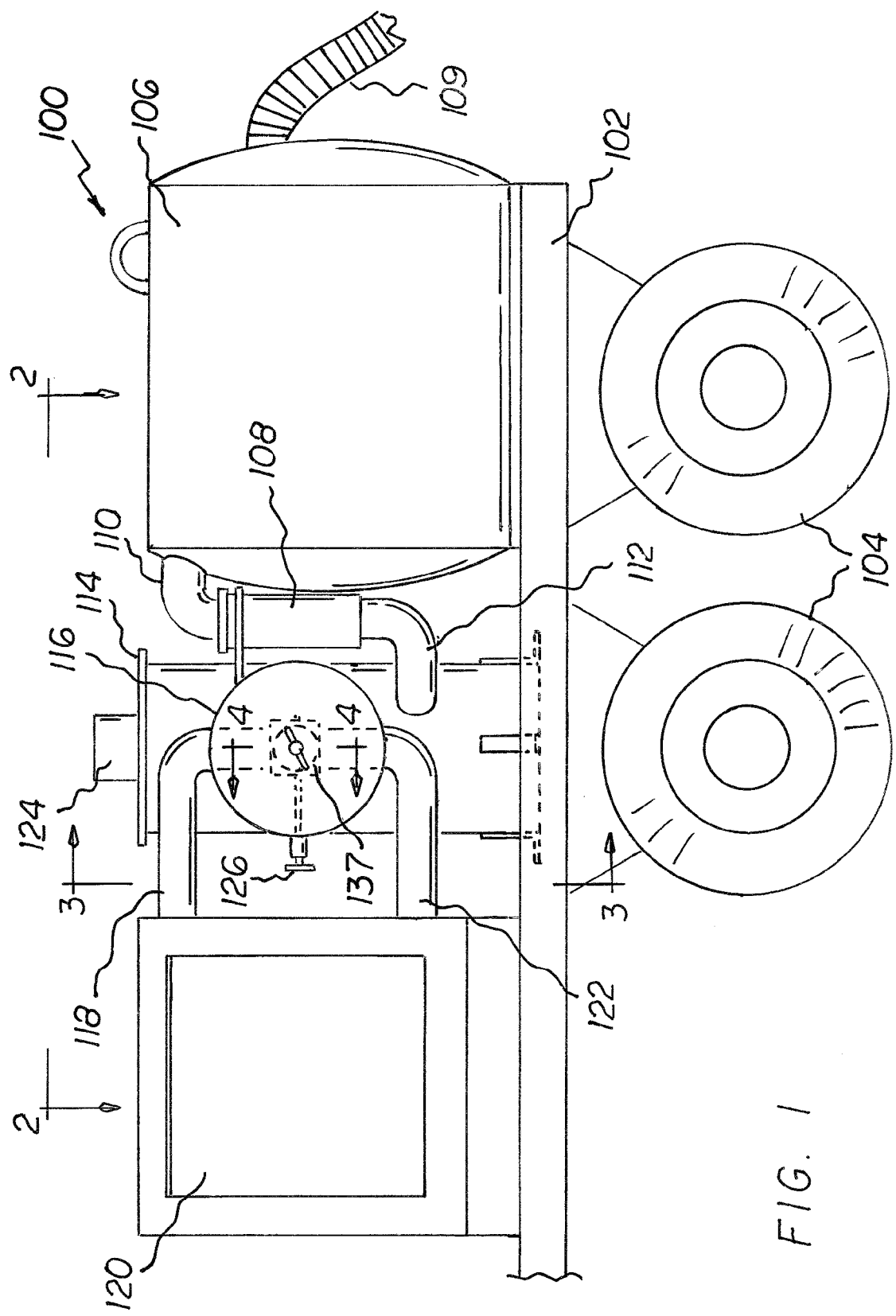
FIG. 1 is a left side elevational view of one embodiment of an air diverter system for a vacuum excavator.

Referring now to FIG. 1, a particular embodiment of an air diverter system for a vacuum excavator is disclosed and generally designated 100. The air diverter system and vacuum excavator 100 may be mounted to a truck or trailer 102 on wheels 104 as shown in FIG. 1. The trailer 102 provides a platform to mount the various pieces of equipment, which includes a debris tank 106, a bag house 114, a filter housing 116, and a vacuum pump 120.

The vacuum pump 120 provides the suction so that debris may be vacuumed or excavated using a hose 109 secured to the debris tank 102. The debris tank 102 is in fluid communication with the bag house 114 where a coupling 108 may be disposed inline between the debris tank 102 and the bag house 114. The air flow enters the bag house 114 at an angle along a sidewall of the bag house 114 using an inlet port 112 to create a cyclonic air flow within the bag house 114. The cyclonic air flow assists in removing debris and heavier particulates from the air flow before the air flow enters the filter housing 116. The filter housing 116 is secured to the bag house 114 and is used to further remove particulates from the air flow.

A valve housing 137, which is used to control a direction of flow through the system, is in fluid communication between the filter housing 116, the bag house 114, and the vacuum pump 120. A valve member 132 (described below) within the valve housing 137 is used to select the direction of the flow through the system 100. The valve member 132 may be generally planar shaped and configured to rotate about an axis 138 between a first position for standard vacuum operation and a second position for reversing the air flow through the system 100. A selector 126 device is secured to the valve member 132 and the selector 126 may be used to rotate the valve member 132 to change the direction of flow through the system 100. In one particular illustrative embodiment, the selector 126 is a lever arm that is used to manually rotate the valve member 132 to change the direction of flow. In alternative embodiments, an electronic servo or other means may be used to control the valve member 132 automatically and/or remotely. The valve housing 137 may be contained internally within the filter housing 116, which increases hydraulic efficiency by reducing the length of connections required between the bag house 114 and the filter housing 116. In addition, the filter housing 116 protects the valve housing 137 from being damaged accidentally.

Figure 2:
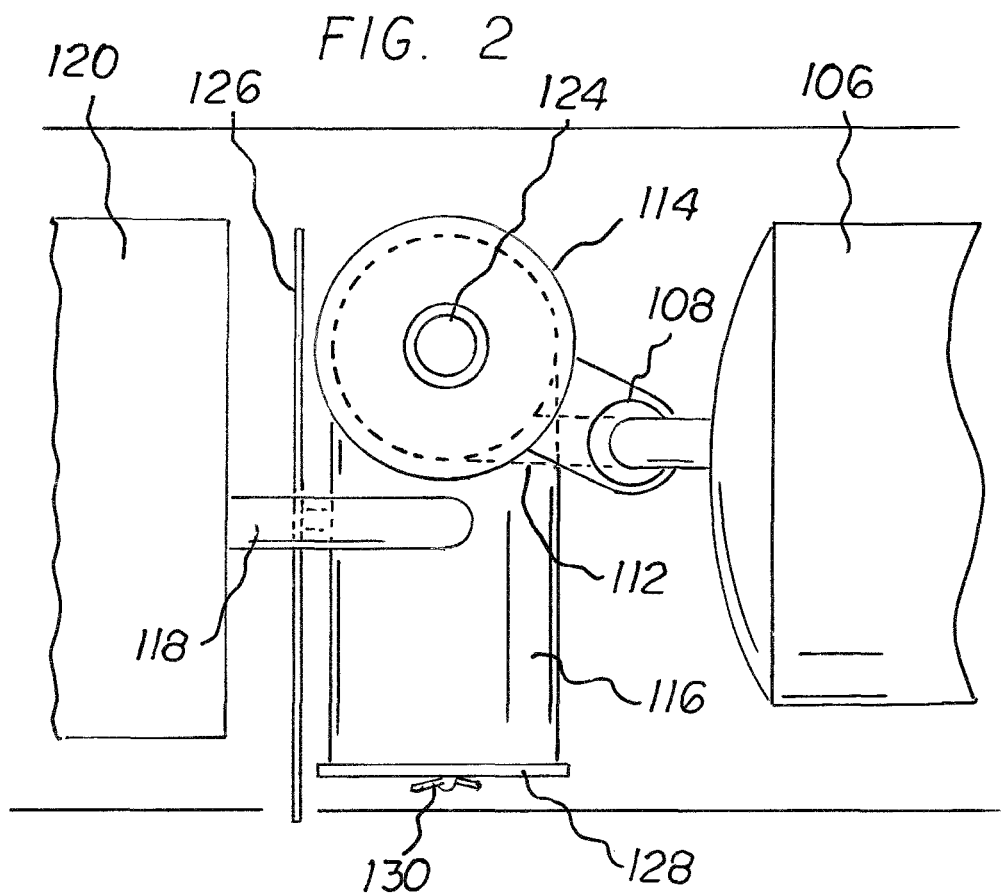
FIG. 2 is a top view of the air diverter system taken along line 2-2 of FIG. 1.
Figure 3:
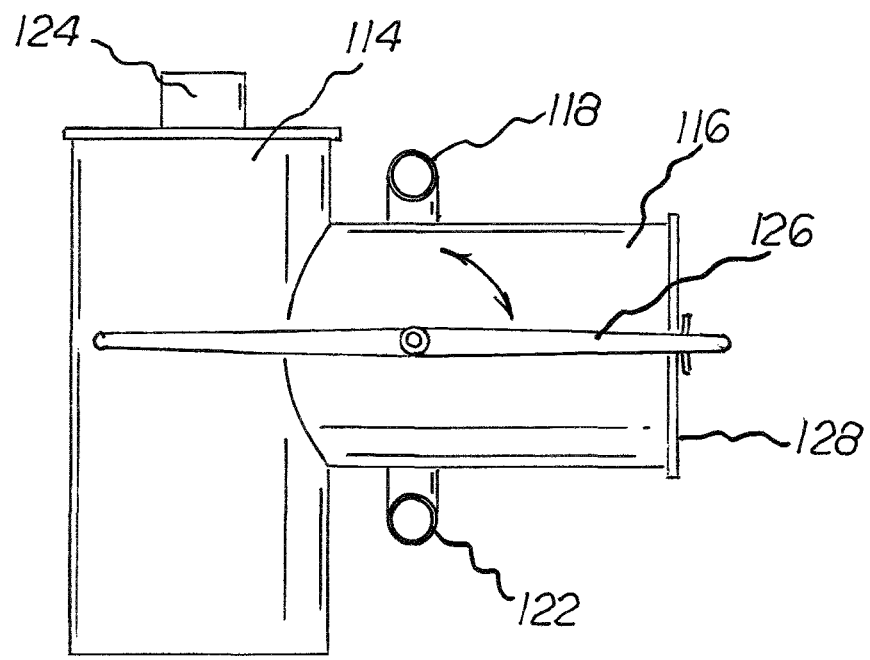
FIG. 3 is a left side elevational view of the air diverter system taken along line 3-3 of FIG. 1.

Referring now to FIGS. 2 and 3, the filter housing 114 is in fluid communication with the vacuum pump 120, and is intended to remove debris and particulates from the air flow before entering the vacuum pump 120. The vacuum pump 120 includes a vacuum pump inlet conduit 118 and a vacuum pump outlet conduit 122. The vacuum pump inlet conduit 118 is on a suction side of the vacuum pump 120 and the vacuum pump outlet conduit 122 is on the positive pressure or blower side of the vacuum pump 120. The air flow enters the vacuum pump 102 through the inlet pipe conduit 118 that connects the filter housing 116 to the vacuum pump 120. The vacuum pump outlet conduit 122 circulates the air flow back to an interior of the bag house 114 to be discharged through an outlet port 124 disposed on a top portion of the bag house 114. The bag house 114 may generally be cylindrical in shape which is conducive to generating the cyclonic air flow within the bag house 114. In addition, the bag house 114 may be lined with acoustic material, which is efficient in absorbing medium and high frequency noise.

Figure 4:
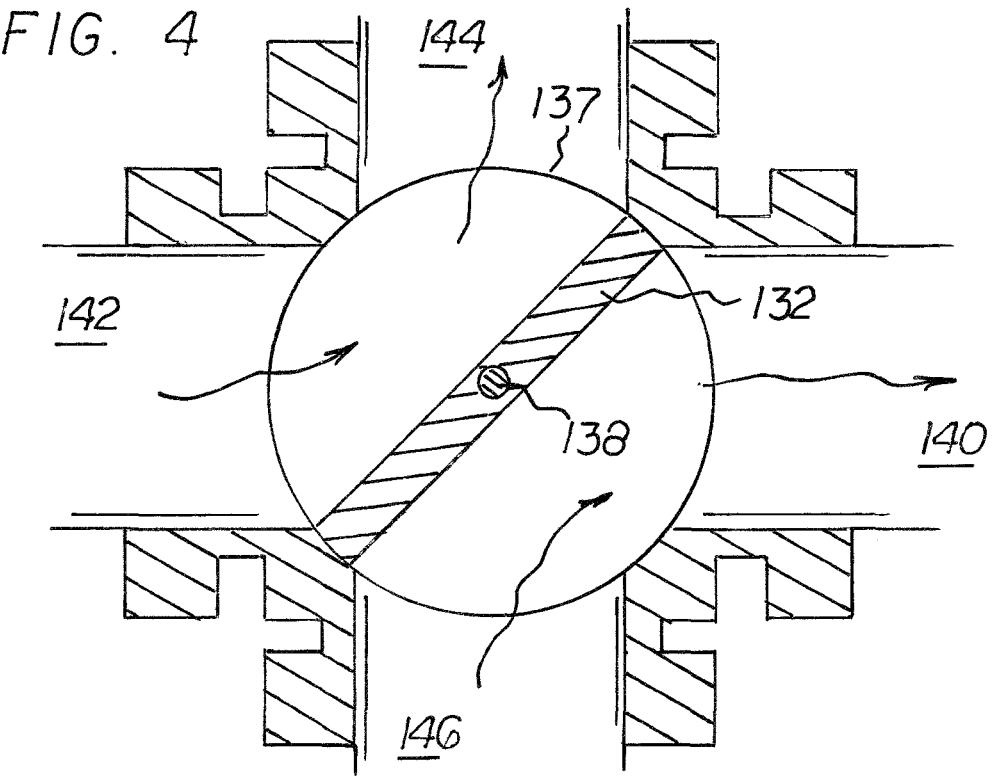
FIG. 4 is a sectional elevational view taken along line 4-4 of FIG. 1, showing an interior of a valve housing in a vacuum configuration, where a flow path is indicated by arrows.
Figure 5:
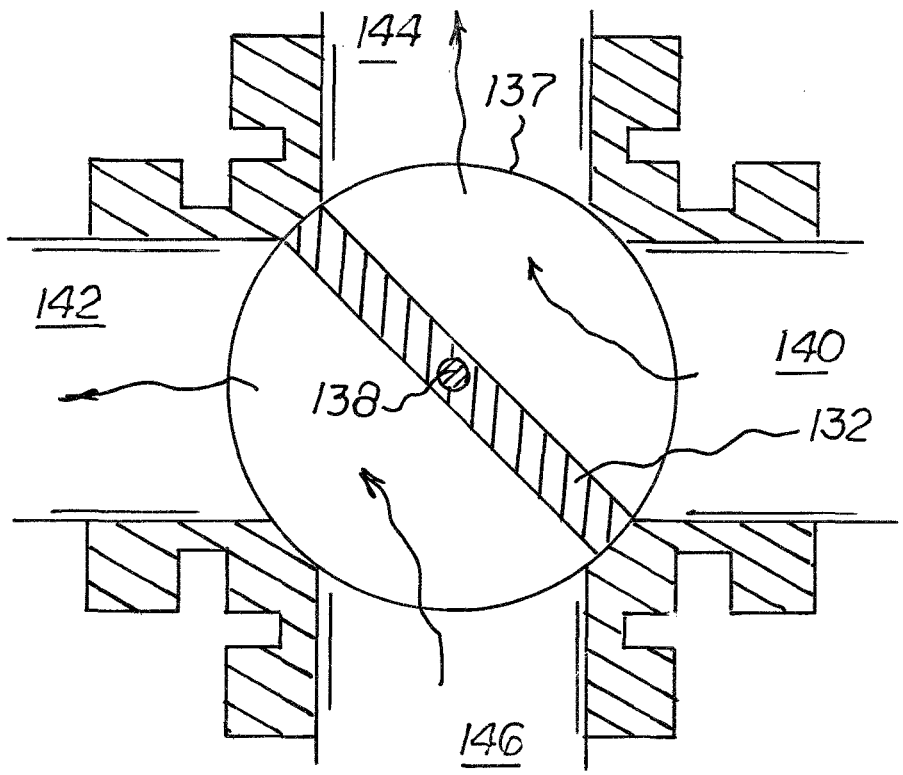
FIG. 5 is a sectional elevational view showing the interior of the valve housing in a backwash configuration, where the flow path is indicated by arrows.

In a particular illustrative embodiment, the valve housing 137 has four orifices that can be selectively connected to control a direction of the air flow through the system 100 as shown in FIGS. 4 and 5. For example, a first orifice 140 of the valve housing 137 is in communication with the bag house 114. A second orifice 142 of the valve housing 137 is in communication with the filter chamber 134. A third orifice 144 of the valve housing 137 is in communication with the vacuum pump inlet conduit 118. A fourth orifice 146 of the valve housing 137 is in communication with the vacuum pump outlet conduit 122. Connecting particular orifices together will control the air flow through the system 100 as explained below.

For example, in FIG. 4 the selector 126 is shown in the standard operating position.

The valve member 132 has been selectively aligned to create a passageway for airflow between the third orifice 144 of the valve housing 137 that is in communication with the vacuum pump inlet conduit 118 and the second orifice 142 that is in communication with a filter 135. One of ordinary skill in the art will appreciate that the filter media of the filter 135 may be a variety of materials, including metal and plastic. In the standard vacuum operation, the air is pulled through the filter 135, to the vacuum pump 120, to an inner concentric tube 136 (described below) of the bag house 114, and the air is ultimately discharged through the outlet port 124 of the bag house 114. A circumferential interior wall of the valve housing 137 defines a cylindrically shaped passageway and opposing ends of the valve member 132 conform to a shape of the interior wall of the valve housing 137 so that a substantially air tight connection is created for the air flow.

When the valve member 132 to rotated about its axis 138 to a second position, the passageway for the airflow is changed as shown in FIG. 5. In this position, instead of the air flow being pulled through the filter 135, the air flow is reversed and pulled in from the outlet port 124 of the bag house 114. The air flow then is pushed through the filter 135 and into the outer concentric tube 133 (described below) of the bag house 114, which is in communication with the debris tank 102.

Figure 6:
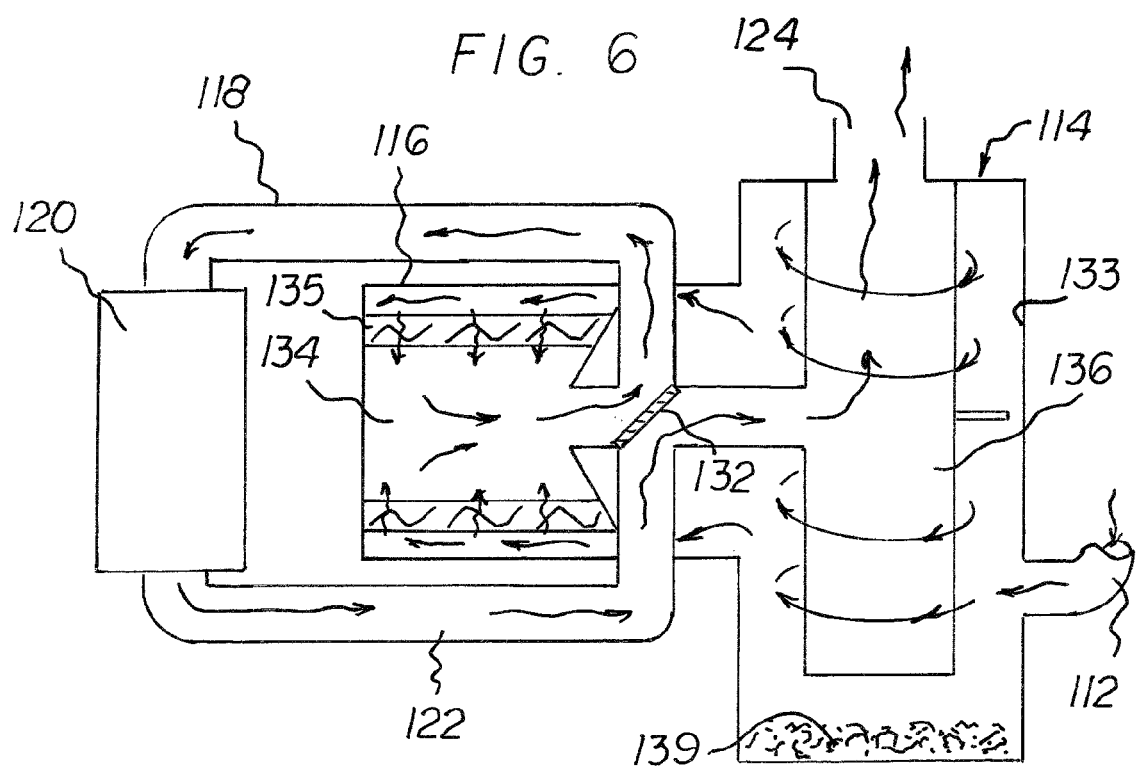
FIG. 6 is a schematic of the air diverter system showing the flow path through the system in the standard vacuum operation configuration.
Figure 7:
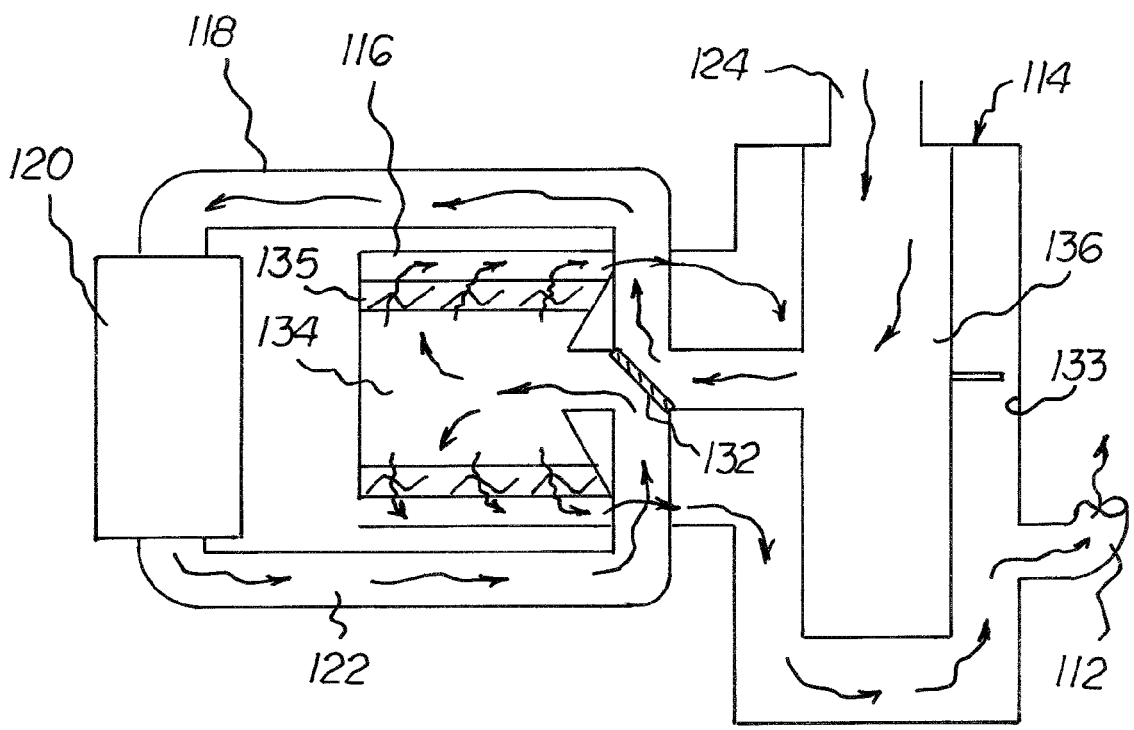
FIG. 7 is a schematic of the air diverter system showing the flow path through the system in a second backwash configuration.

Schematics of the air flow of the system 100 for the two different operating conditions are shown in FIGS. 6 and 7. As described above, the bag house 114 includes the inlet port 112, which is in communication with the debris tank 106. The bag house 114 is formed by an outer concentric tube 133 and an inner concentric tube 136, where the inner concentric tube 136 is in communication with the first orifice 140 and the outlet port 124, and the outer concentric tube 133 is in communication with the inlet port 112 and the filter housing 116. The outlet port 124 of the interior concentric tube 136 is in communication with ambient air. As described above, the inlet port 112 is configured and secured to a periphery of the bag house 114 as to create the cyclonic air flow within the bag house 114 indicated by the arrows to cause debris 139 to settle out. The air flow between the filter housing 116 and the outer concentric tube 133 of the bag house 114 is generally aligned. The removable filter 135 is configured to be easily accessed and serviced from the ground by removing an end plate 128 secured to the filter housing 116. In operation, the air passes through the filter 135 where particulates and debris are captured in filter media of the filter 135.

In a particular illustrative embodiment, the valve housing 137 is interposed between the bag house 114 and the filter housing 116. The valve member 132 is mounted within the valve housing 137 and is configured to rotate about the axis 138. The air flow between the bag house 114 and the filter housing 116 in standard operation is from the bag house 114, around the valve housing and to a concentric area formed between an exterior surface of the filter 135 and the filter housing 116. The air flow continues inwardly through the filter 135 into the interior void of the filter chamber 134. The air flow then exits the filter chamber 134 of the filter 135 to enter the second orifice 142 of the valve housing 137 as indicated by the arrows. Depending on the position of the valve member 132, the air flow will exit the valve housing 137 to the vacuum pump inlet conduit 118 as illustrated in FIG. 6.

In a similar, but different air flow direction, once the valve member 132 is rotated to a second position or backwash position as shown in FIG. 7, the air flow through the system 100 is reversed. For example, the air flow now begins by entering the outlet port 124 of the bag house 114, to the valve housing 137, and to the vacuum pump inlet conduit 118. The air flow exits the vacuum pump 120 through the outlet conduit 122 to the valve housing 137. When the valve member 132 is in the backwash position, the valve member 132 diverts the air flow into the interior void of the filter chamber 134 and outwardly through the filter 135 to the concentric area between the exterior surface of the filter 135 and the filter housing 116 as indicated by the arrows. From there, the air flows around the valve housing 137 and into the bag house 114, where the air exits through the inlet port 112 to the debris tank 102. The debris tank 102 is then pressurized and the air ultimately exits the hose 109 where it will dislodge any blockage in the hose 109. Accordingly, the system 100 can dislodge any blockage by simply rotating the valve member 132 to reverse the air flow without having to change any connections between the vacuum excavator equipment.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features.

What is claimed is:

1. An air diverter system for a vacuum excavator, the system comprising:
   a bag house having an inner concentric tube and an outer concentric tube;
   a filter housing secured to a side of the bag house, wherein the filter housing is in communication with the outer concentric tube of the bag house;
   a filter chamber disposed inside the filter housing;
   a valve housing interposed between the bag house and the filter housing;
   a valve member mounted within the valve housing and configured to rotate about an axis; and
   a selector for rotating the valve member and selectively aligning a passageway of an airflow between the valve housing in communication with a vacuum pump inlet and a vacuum pump outlet.

2. The system of claim 1, the bag house housing further comprising an inlet port in communication with a debris tank, and a discharge port in communication with ambient air.

3. The system of claim 2, further comprising:
   a first orifice of the valve housing in communication with the inner concentric tube of the bag house;
   a second orifice of the valve housing in communication with the filter chamber;
   a third orifice of the valve housing in communication with the vacuum pump inlet; and
   a fourth orifice of the valve housing in communication with the vacuum pump outlet;
   wherein the inner concentric tube is in communication with the first orifice and the discharge port, and the outer concentric tube is in communication with the inlet port and the filter housing.

4. The system of claim 3, wherein the inlet port is configured and secured to a periphery of the bag house to create a cyclonic air flow within the outer concentric tube of the bag house that causes debris to settle out of the cyclonic air flow.

5. The system of claim 4, wherein an air flow between the filter housing and the bag house is generally aligned.

6. The system of claim 5, further comprising a removable filter within the filter housing, wherein the removable filter is configured to be serviced by removing an end plate secured to the filter housing.

7. The system of claim 6, wherein the valve member is planar shaped and configured to rotate about an axis.

8. The system of claim 7, wherein a circumferential interior wall of the valve housing defining a cylindrically shaped passageway and opposing ends of the valve member conforming to a shape of the interior wall of the valve housing.

9. The system of claim 8, wherein the filter is a filter cartridge, a bag filter, a pleated filter, packed fiberglass filter, or any combination thereof.

* * * * *